(12) United States Patent
Zhang et al.

(10) Patent No.: US 11,574,249 B2
(45) Date of Patent: Feb. 7, 2023

(54) STREAMLINING DATA PROCESSING OPTIMIZATIONS FOR MACHINE LEARNING WORKLOADS

(71) Applicant: International Business Machines Corporation, Armonk, NY (US)

(72) Inventors: Qi Zhang, Elmsford, NY (US); Petr Novotny, Mount Kisco, NY (US); Hong Min, Poughkeepsie, NY (US); Ravi Nair, Briarcliff Manor, NY (US); Shyam Ramji, LeGrange, NY (US); Lei Yu, Sleepy Hollow, NY (US); Takuya Nakaike, Yokohama (JP); Motohiro Kawahito, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 16/890,091

(22) Filed: Jun. 2, 2020

(65) Prior Publication Data

US 2021/0374602 A1 Dec. 2, 2021

(51) Int. Cl.
*G06N 20/00* (2019.01)
*G06F 16/25* (2019.01)

(52) U.S. Cl.
CPC .......... *G06N 20/00* (2019.01); *G06F 16/254* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 9,916,538 B2 * | 3/2018 | Zadeh | A61B 5/7221 |
| 2007/0165035 A1 * | 7/2007 | Duluk | G06T 15/20 |
| | | | 345/506 |
| 2011/0231830 A1 * | 9/2011 | Udayakumaran | G06F 8/4441 |
| | | | 717/160 |
| 2013/0229416 A1 | 9/2013 | Krajec et al. | |
| 2018/0017456 A1 | 1/2018 | Kautzsch et al. | |

(Continued)

FOREIGN PATENT DOCUMENTS

| CN | 110111084 A | 8/2019 |
|---|---|---|
| CN | 111191771 A | 5/2020 |

OTHER PUBLICATIONS

PCT Notification of Transmittal of The International Search Report and The Written Opinion of The International Searching Authority, or The Declaration for Application PCT/CN2021/093933 dated Aug. 19, 2021.

(Continued)

*Primary Examiner* — Hung D Le
(74) *Attorney, Agent, or Firm* — Patterson + Sheridan, LLP

(57) ABSTRACT

Techniques for refinement of data pipelines are provided. An original file of serialized objects is received, and an original pipeline comprising a plurality of transformations is identified based on the original file. A first computing cost is determined for a first transformation of the plurality of transformations. The first transformation is modified using a predefined optimization, and a second cost of the modified first transformation is determined. Upon determining that the second cost is lower than the first cost, the first transformation is replaced, in the original pipeline, with the optimized first transformation.

20 Claims, 5 Drawing Sheets

(56) References Cited

U.S. PATENT DOCUMENTS

| | | | |
|---|---|---|---|
| 2019/0114533 A1 | | 4/2019 | Ng et al. |
| 2020/0242510 A1* | | 7/2020 | Duesterwald .......... G06N 5/003 |
| 2020/0272909 A1* | | 8/2020 | Parmentier ............ G06N 20/00 |
| 2020/0380416 A1* | | 12/2020 | Zion ................... G06Q 30/0204 |
| 2021/0055915 A1* | | 2/2021 | Guo .................... G06F 3/04817 |
| 2021/0117232 A1* | | 4/2021 | Sriharsha .............. G06F 16/256 |

OTHER PUBLICATIONS

IBM, "Self Learning Method To Predict a Workload Indicator for Provisioning of Resources," Sep. 18, 2007, 11 pages.

Anonymously, "Method and System for Environment Aware Maintenance Task Optimization based on Machine Learning," Jul. 13, 2017, 5 pages.

Anonymously, "Mainframe Batch Analytics with Machine Learning—Adding a new workload based on system resource availability," Jul. 12, 2019, 5 pages.

Anonymously, "Method for a Real-Time and Adaptive Workflow Engine for Increased Worker Engagement and Productivity," Mar. 15, 2012, 5 pages.

Xin et al., "HELIX: Holistic Optimization for Accelerating Iterative Machine Learning," VLDB Endowment, vol. 12, No. 4, ISSN 2150-8097, Dec. 14, 2018.

"Machine learning-Based Advanced Analytics Using Intel Technology," Reference Architecture, 10 pages, Jul. 10, 2022.

Kunft, A. et al. "An Intermediate Representation for Optimizing Machine Learning Pipelines", Jul. 2019.

\* cited by examiner

STREAMLINING DATA PROCESSING OPTIMIZATIONS FOR MACHINE LEARNING WORKLOADS

BACKGROUND

The present disclosure relates to machine learning optimizations, and more specifically, to improved techniques to optimize machine learning pipelines.

Machine learning (ML) systems often rely on large amounts of data to effectively and accurately operate. For example, a large volume of data is typically needed to adequately train the system. Similarly, during use, the models are frequently expected to process a significant amount of data to provide the desired inferences, predictions, and classifications. Moreover, during re-training or refining procedures, it is common to use prior data (which can include training data and deployment data) to reconfigure the models, which can require evaluation of massive amounts of records.

In existing systems, the data typically passes through a preprocessing system in order to prepare it to be used as input to the actual model(s). The preprocessing system can involve one or more evaluations and transformations on the raw input data. This preprocessing can incur significant computational costs, including compute time (e.g., cycles on a processor) and memory requirements. In fact, in many systems, preprocessing input data involves more computational cost than actually evaluating the data with the ML model(s). For these and other reasons, it is vital that preprocessing systems operate efficiently, in order to reduce expenses and latency in the system.

For example, in deployments that rely on real-time inference (e.g., where input data is received as a stream), the input data is typically high throughput, and requires rapid evaluation. If the preprocessing system is not efficient, it acts as a significant bottleneck in the process. Similarly, in batch inference systems, a large number of records are typically evaluated at a single time. If the preprocessing systems are inefficient, each batch therefore requires additional and significant resources to ingest. Optimizations in this preprocessing system are critical to the overall performance of the models. However, existing systems rely on substantial manual efforts to identify and implement optimizations in the system. This again introduces additional costs and delays. Further, these manual approaches are often inherently subjective, and do not provide intelligent and systematic techniques to refine the systems.

SUMMARY

According to one embodiment of the present disclosure, a method is provided. The method includes receiving an original file of serialized objects; identifying, based on the original file, an original pipeline comprising a plurality of transformations; determining a first computing cost for a first transformation of the plurality of transformations; modifying the first transformation using a predefined optimization; determining a second cost of the modified first transformation; and upon determining that the second cost is lower than the first cost, replacing, in the original pipeline, the first transformation with the optimized first transformation. Advantageously, such a method enables significant data-driven improvements in processing pipelines.

According to some embodiments of the present disclosure, any combination of the above embodiments can further include techniques where identifying the original pipeline comprises generating a data processing graph, wherein each respective vertex in the data processing graph represents a respective transformation of the plurality of transformations, and wherein each respective edge in the data processing graph specifies data flow in the original pipeline. Such an embodiment is advantageous at least because it enables granular evaluation and understanding of the pipeline, in order to dynamically analyze each element and identify potential improvements.

According to some embodiments of the present disclosure, any combination of the above embodiments can further include techniques wherein generating the data processing graph comprises: instantiating the original pipeline based on the original file; executing the original pipeline on sample data; identifying the plurality of transformations based on the execution; and identifying a sequence of the plurality of transformations based on the execution. Advantageously, such an embodiment allows the system to identify the specific transformations and data flow involved in the pipeline, while simultaneously allowing the system to monitor the original pipeline in use. This reduces complexity and accelerates improvement.

According to some embodiments of the present disclosure, any combination of the above embodiments can further include techniques wherein generating the data processing graph comprises evaluating the original file to identify the plurality of transformations and the data flow in the original pipeline, without instantiating the original pipeline. Such an embodiment can be advantageous because it allows the system to begin evaluation of the pipeline by directly looking into the file, without requiring resource usage to instantiate the pipeline or process actual data.

According to some embodiments of the present disclosure, any combination of the above embodiments can further include techniques wherein determining the first computing cost for the first transformation comprises: executing the first transformation on sample data; and evaluating the execution to determine a latency of performing the first transformation. Advantageously, this allows the system to dynamically identify costs associated with processing data in a realistic way, which better reflects what can be expected at runtime.

According to some embodiments of the present disclosure, any combination of the above embodiments can further include techniques wherein the predefined optimization comprises increased parallelization in the first transformation. Such an embodiment enables significant improvement over unrefined transformations, as parallelism is frequently useful in reducing delay in processing.

According to some embodiments of the present disclosure, any combination of the above embodiments can further include techniques wherein the predefined optimization comprises a one-row optimization for the first transformation. Such an embodiment enables significant improvement over unrefined transformations, as these one-row optimizations are often much faster and utilize fewer resources when the data allows it.

According to some embodiments of the present disclosure, any combination of the above embodiments can further include generating an optimized file of serialized objects based on the original pipeline and the optimized first transformation. Advantageously, such an embodiment enables the system to return a refined pipeline to the requesting entity in a useful format that is easy to transmit and analyze.

According to a different embodiment of the present disclosure, any combination of the above-discussed embodiments can be implemented by one or more computer-readable storage media. The computer-readable storage media collectively contain computer program code that, when executed by operation of one or more computer processors, performs an operation. In embodiments, the operation performed can correspond to any combination of the above methods and embodiments.

According to yet another different embodiment of the present disclosure, any combination of the above-discussed embodiments can be implemented by a system. The system includes one or more computer processors, and one or more memories collectively containing a program which, when executed by the one or more computer processors, performs an operation. In embodiments, the operation performed can correspond to any combination of the above methods and embodiments.

DETAILED DESCRIPTION

Figure 1:
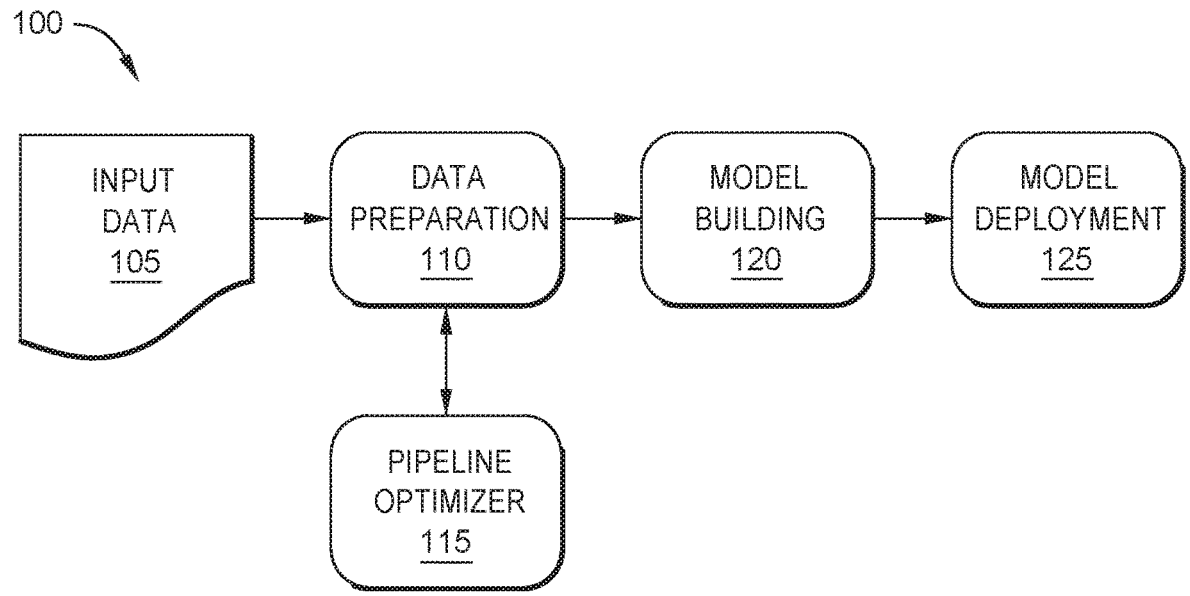
FIG. 1 depicts an environment for machine learning, including a pipeline optimizer configured to automatically identify and substitute transformation modifications in order to improve the functionality of the system, according to one embodiment disclosed herein.

Embodiments of the present disclosure provide techniques to intelligently and automatically optimize data preprocessing systems by reducing computing costs they require. In one embodiment, the system receives a data transformation pipeline as its input, and returns a modified/refined pipeline that reduces computational costs of the processing. In some embodiments, rather than receiving a pipeline itself, the system receives a data file specifying a set of serialized objects. That is, the input can be a file made by serializing a pipeline structure. For example, in one such embodiment, the input is a Python® pickle file. In an embodiment, a client designing their preprocessing pipeline can serialize it and transmit or otherwise provide it to the optimization system, which evaluates it for potential optimizations.

In an embodiment, the system can first identify the relationships among the pipeline steps. This can include, for example, generating a data preprocessing graph for the pipeline, where each vertex or node in the graph corresponds to a step or transformation in the pipeline, and each edge specifies data flow between the operations, as indicated in the pipeline. In one embodiment, the system does so by instantiating the pipeline using the received file (e.g., deserializing the file to build the pipeline), and processing a set of sample data using the pipeline. By observing this execution, the system can identify the transformation functions that are invoked, as well as the sequence of these transformations. This may be accomplished by observing how the data changes in each step, by adding reflection hooks to each transformation to emit information relating to the processing, and the like. In another embodiment, the system analyzes the serialized file itself to build the graph, without actually instantiating or running the pipeline.

In some embodiments, the system can further determine the computational costs of one or more of the transformations in the pipeline. These costs can include, for example, computational resource usage (such as memory usage, storage requirements, processor usage, network usage, and the like), latency costs, and the like. In one embodiment, the system determines these costs by instantiating the pipeline and adding hooks to each transformation operation. When the pipeline is then used during runtime (to process training or runtime data), the system can determine the costs of each operation, based on the actual data that is used with the ML system. In another embodiment, the system executes the transformations on sample data in order to estimate or determine the costs of each. This sample data may be provided by the client (such that it better aligns with the expected real data).

In embodiments, the system can similarly determine the costs of potential optimizations or modifications to the transformation operations. In one embodiment, the optimization system can maintain a library or collection of predefined modified/alternative transformations. For each transformation in the original pipeline, the system can identify a set of zero or more alternatives/modifications from this library. The system can then evaluate each such alternative to determine its costs. In at least one embodiment, each transformation is associated with a name or other identifier, a set of inputs, and a set of outputs. Based on this information, the system can identify the alternatives/modified transformations that can replace the operation in the existing pipeline.

For example, a transformation may be designed or modified to take advantage of parallelism, which can significantly reduce costs when the input data includes a large number of rows or columns. Similarly, one-row optimizations can improve costs for single records or smaller datasets. In an embodiment, the system can maintain any number of alternative transformation functions for a given transformation in the original pipeline. By executing each alternative using the same sample data (or real data during runtime), the system can identify the operation that is most efficient, with respect to the actual data and pipeline being evaluated.

Once each modification has been evaluated, in one embodiment, the system can apply the selected optimizations to the original pipeline, such as by replacing the original function signature with the selected (optimized) version. In one embodiment, the system can then begin using this optimized pipeline to process received data for the pipeline/client. In another embodiment, the system can serialize this new pipeline and return it to the client (or to another system that will execute the preprocessing pipeline and/or ML models). This refined pipeline can operate more effectively and efficiently than the original pipeline, reducing computational expense and improving the functionality of the systems.

FIG. 1 depicts an environment 100 for machine learning, including a Pipeline Optimizer 115 configured to automatically identify and substitute transformation modifications in order to improve the functionality of the system, according to one embodiment disclosed herein. In the illustrated workflow, Input Data 105 is received and processed during an initial preprocessing step, labeled Data Preparation 110. This Data Preparation 110 can include, for example, restructuring and/or reformatting the Input Data 105, aggregating or partitioning the Input Data 105, and the like. In at least one embodiment, the Data Preparation 110 includes use of a transformation pipeline, where the Input Data 105 is sequentially processed with a variety of transformations and operations. In embodiments, this pipeline may be linear or non-linear. That is, in at least one embodiment, the pipeline may include loops, recursive sections, and the like. In many realistic use cases, the Data Preparation 110 is computationally complex, and is often responsible for the majority of computing costs required to evaluate the Input Data 105.

In the illustrated embodiment, a Pipeline Optimizer 115 can be used to refine the Data Preparation 110, such that it operates more efficiently, with reduced latency, and/or using fewer computational resources. In some embodiments, the Pipeline Optimizer 115 iteratively analyzes each transformation in the pipeline in order to identify alternatives, and evaluates each such alternative to identify optimal substitutions. As illustrated, after passing through Data Preparation 110, Model Building 120 is performed. Model Building 120 generally includes constructing, training, and refining ML models. These models can include supervised models (e.g., trained with labeled training data), unsupervised models (which are prepared without labeled data), and the like. Generally, Model Building 120 can include creation of any number and variety of models.

After the models have been built, in some embodiments, they are evaluated or validated (e.g., using test data). In some embodiments, this can result in new Input Data 105 being acquired and prepared in order to refine the systems. Once the model(s) are acceptable, the process proceeds to Model Deployment 125, where they model(s) are used during runtime. In an embodiment, each element in the workflow may of course be repeated at any time. For example, after Model Deployment 125, the model(s) may be continuously or periodically refined using new data. Similarly, the models may be rebuilt completely (e.g., entirely retrained) at times. Each of these reconfigurations requires that Input Data 105 be processed by the Data Preparation 110 pipeline. Similarly, during use, when new data is received and evaluated by the deployed models, it must first be passed through the Data Preparation 110 stage. Thus, the Data Preparation 110 is performed not only during training, but also throughout the life of the model. This increases the importance of optimized and efficient transformation pipelines.

Figure 2:
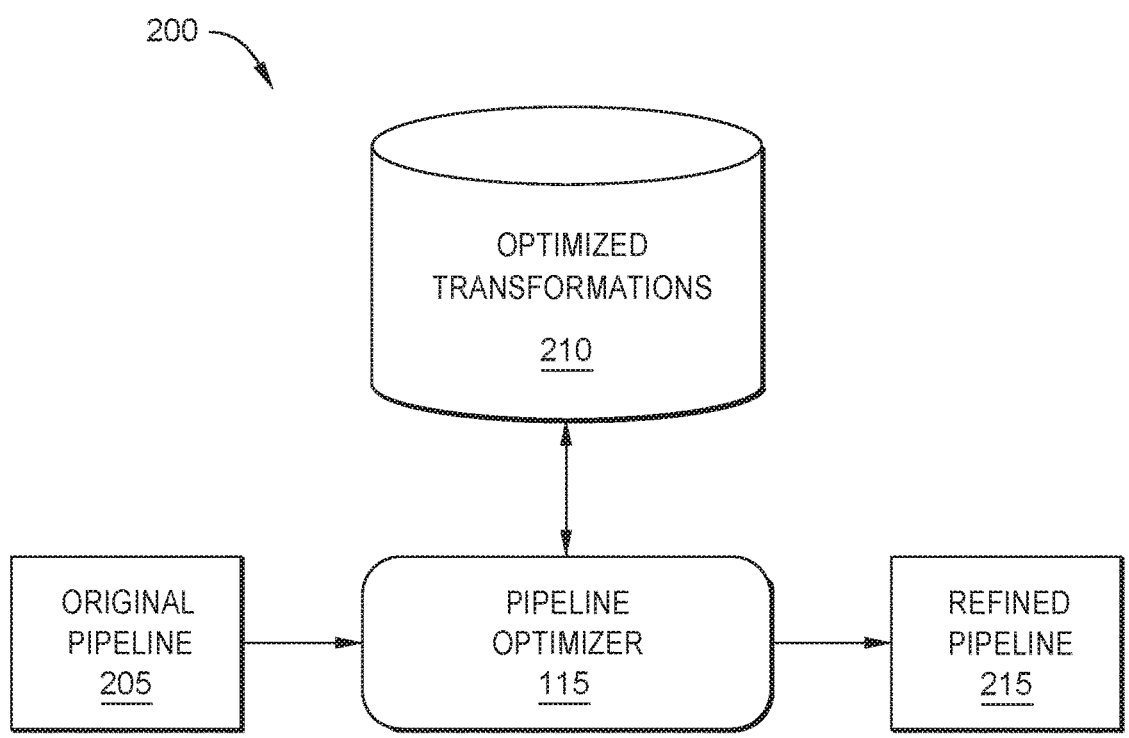
FIG. 2 illustrates a workflow for pipeline optimization, according to one embodiment disclosed herein.

FIG. 2 illustrates a workflow 200 for pipeline optimization, according to one embodiment disclosed herein. In the illustrated embodiment, an Original Pipeline 205 is received. In an embodiment, the Original Pipeline 205 corresponds to a set or sequence of data transformations that are applied to input data in order to prepare it for use in an ML system. For example, the Original Pipeline 205 may include a sequence of operations that convert raw input data into prepared data suitable for training a model and/or for input into a model at runtime. In at least one embodiment, the Original Pipeline 205 is received by the Pipeline Optimizer 115 in the form of a serialized data file. For example, in one such embodiment, the input is a Python® pickle file.

As illustrated, the Pipeline Optimizer 115 evaluates the Original Pipeline 205, relying on a set of predefined Optimized Transformations 210, in order to generate a Refined Pipeline 215. In an embodiment, the Optimized Transformations 210 generally include transformation operators, functions, methods, techniques, modules, or other components. Each Optimized Transformation 210 is configured to receive one or more elements of input data and perform one or more operations or transformations. In an embodiment, some or all of the Optimized Transformations 210 are further configured to produce some output (e.g., to output the modified/transformed inputs).

In an embodiment, each Optimized Transformation 210 is a refined or modified version of one or more original transformations. For example, suppose an original transformation function (which may be used in Original Pipelines 205) involves reformatting the input data. In one embodiment, the Optimized Transformations 210 can include a set of zero or more modified or refined versions of the reformatting transformation. That is, users may have previously defined possible alternatives or modifications to the transformation, which may make it more efficient on some datasets. In such an embodiment, the Optimized Transformations 210 may be configured to receive the same input and produce the same output as the original transformation, but may do so in differing ways (e.g., taking advantage of parallelism, outsourcing some transformations to other more competent components, and the like).

In one embodiment, each Optimized Transformation 210 is associated with a corresponding signature that can be used to identify it. This signature includes, in some embodiments, an indication of the input(s) and/or output(s) for the operation. In some embodiments, the signature further includes a name of the Optimized Transformation 210. In one embodiment, for each transformation operation in the Original Pipeline 205, the Pipeline Optimizer 115 searches the Optimized Transformations 210 to determine whether any alternatives exist. This can include identifying Optimized Transformations 210 with the same or overlapping signature as the original transformation (e.g., with the same or similar name/description, and the same inputs/outputs).

The Pipeline Optimizer 115 can then iteratively evaluate each such alternative in order to determine which should be applied. In one embodiment, the Pipeline Optimizer 115 does so by processing test data using the alternative(s) and the original. In embodiments, the best transformation operator is likely to differ, depending on the nature and structure of the input data. For example, parallelism may reduce computational expense for some input data, if the input data frame can be partitioned across multiple parallel pipelines. Similarly, many standard transformation functions are designed to operate on input matrices (e.g., with dimensions of M columns and N rows). If the actual input data exists in a single dimension (e.g., a single column with multiple rows, or a single row with multiple columns), one-row optimizations may be applied to reduce complexity.

In embodiments, the Pipeline Optimizer 115 can select the optimal function based on any number of criteria, including the latency of the operation when operating on the data, the computational resources required, and the like. Once the best function has been identified (which may be an Optimized Transformation 210 or the original transformation), the Pipeline Optimizer 115 selects this operation for the pipeline, and proceeds to the next step in the pipeline. Once this process completes, as illustrated, the Pipeline Optimizer 115 outputs a Refined Pipeline 215, which may have some or all of its functions replaced with tailored/refined operations. In some embodiments, the Refined Pipeline 215 is deployed and used by the system. In at least one embodiment, the Refined Pipeline 215 is serialized and returned to the client that originally provided the Original Pipeline 205 for analysis.

Figure 3:
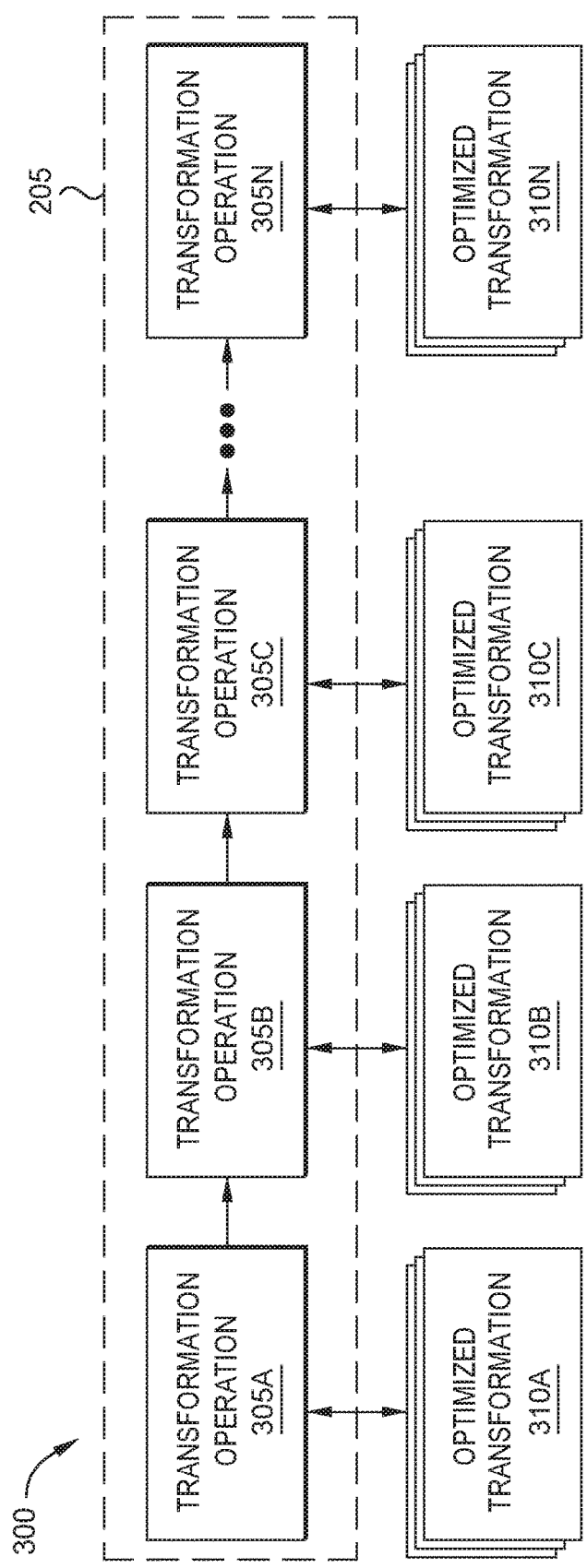
FIG. 3 depicts a processing pipeline including a sequence of transformation operations and sets of alternative optimized transformations, according to one embodiment disclosed herein.

FIG. 3 depicts a processing pipeline 300 including a sequence of transformation operations and sets of alternative optimized transformations, according to one embodiment disclosed herein. In the illustrated embodiment, an Original Pipeline 205 includes a sequence of Transformation Operations 305A-N. Although depicted as a sequential workflow, in some embodiments, the Original Pipeline 205 may include iterations, loops, cycles, and other complexities. Generally, each Transformation Operation 305A-N is a defined transformation applied to input data. The arrows in the Original Pipeline 205 indicate the flow of data through the pipeline. For example, data is processed by the Transformation Operation 305A. After this processing, it is passed to the Transformation Operation 305B, which performs the corresponding operations. Subsequently, the data is provided to the Transformation Operation 305C.

In the illustrated embodiment, the Pipeline Optimizer 115 has identified a set of Optimized Transformations 310A-N for each Transformation Operation 305A-N. That is, the Pipeline Optimizer 115 has determined that the Transformation 305A can be replaced with any of the Optimized Transformations 310A, because they are each configured to receive the same input perform, perform the same operation, and return the same output. Similarly, the Transformation Operation 305B can be replaced with the Optimized Transformations 310B, and so on. In embodiments, each Transformation Operation 305 may have zero or more alternative Optimized Transformations 310. That is, some Transformation Operations 310 may not have any equivalent optimized version, while others have a single alternative or multiple alternatives.

In one embodiment, the set of potential alternative Optimized Transformations 310 are identified for a given Transformation Operation 305 based on their signatures. For example, suppose the Transformation Operation 305A is associated with two inputs and one output, and has a name/description of "DBLookup." In some embodiments, the Pipeline Optimizer 115 can identify Optimized Transformations 310A that utilize the same inputs and outputs. In at least one embodiment, the Pipeline Optimizer 115 identifies Optimized Transformations 310 with the same or a similar name (e.g., "DBLookup v1.1"). In some embodiments, the Optimized Transformations 310 may have the same name as the underlying transformation they were designed to replace, but be associated with other metadata indicating the type of optimization, user who created it, time and/or date it was created, version information, and the like. Once the set of potential alternatives is identified for a given Transformation Operation 305, they can be iteratively evaluated (along with the original operation) in order to select one or more to be substituted into the Original Pipeline 205.

Figure 4:
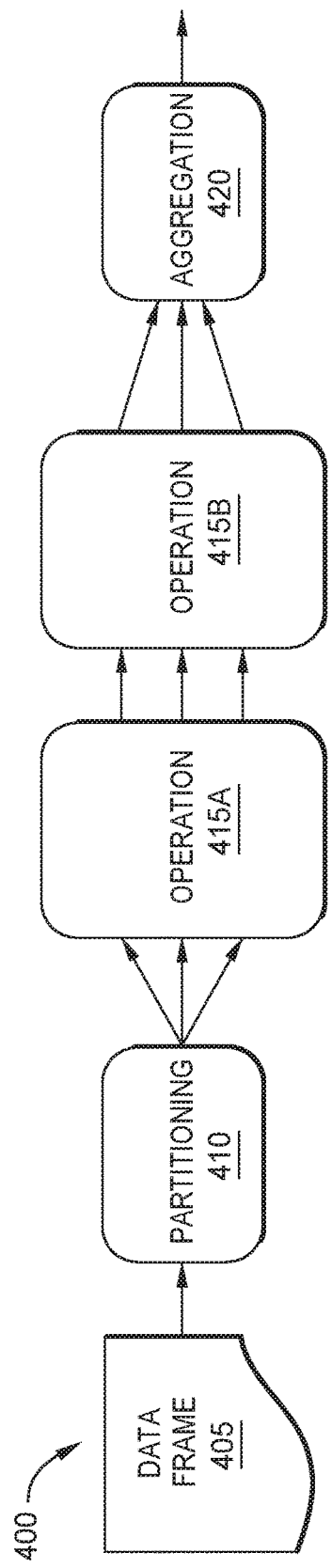
FIG. 4 illustrates a pipeline optimization utilizing parallelism in data frames, according to one embodiment disclosed herein.

FIG. 4 illustrates a pipeline optimization 400 utilizing parallelism in data frames, according to one embodiment disclosed herein. In the illustrated embodiment, one or more portions of an original pipeline have been modified to take advantage of parallelism that can improve computational efficiency in some datasets. Specifically, as illustrated, an input Data Frame 405 undergoes Partitioning 410, and each portion of the partitioned Data Frame 405 undergoes separate (parallel) transformations in Operation 415A and 415B. After Operation 415B, the separate streams are recombined in an Aggregation 420, to yield a single data frame. The frame can then proceed to the next step(s) in the pipeline.

In some embodiments, upon determining that parallelism improves a given transformation operation, the Pipeline Optimizer 115 can insert the Partitioning 410 and Aggregation 420 before and after the given operation, respectively. In at least one embodiment, if the Pipeline Optimizer 115 determines that two or more adjacent operations can both be improved using the same parallelism, the Pipeline Optimizer 115 can place the Partitioning 410 and Aggregation 420 around the set of sequential operations. That is, rather than repeatedly partition and aggregate the data frame at each operation, the Pipeline Optimizer 115 can instead create a pipeline that partitions the data, processes it using the sequence of transformers, and aggregate it at a point where the next operation will not utilize the parallelism.

Figure 5:
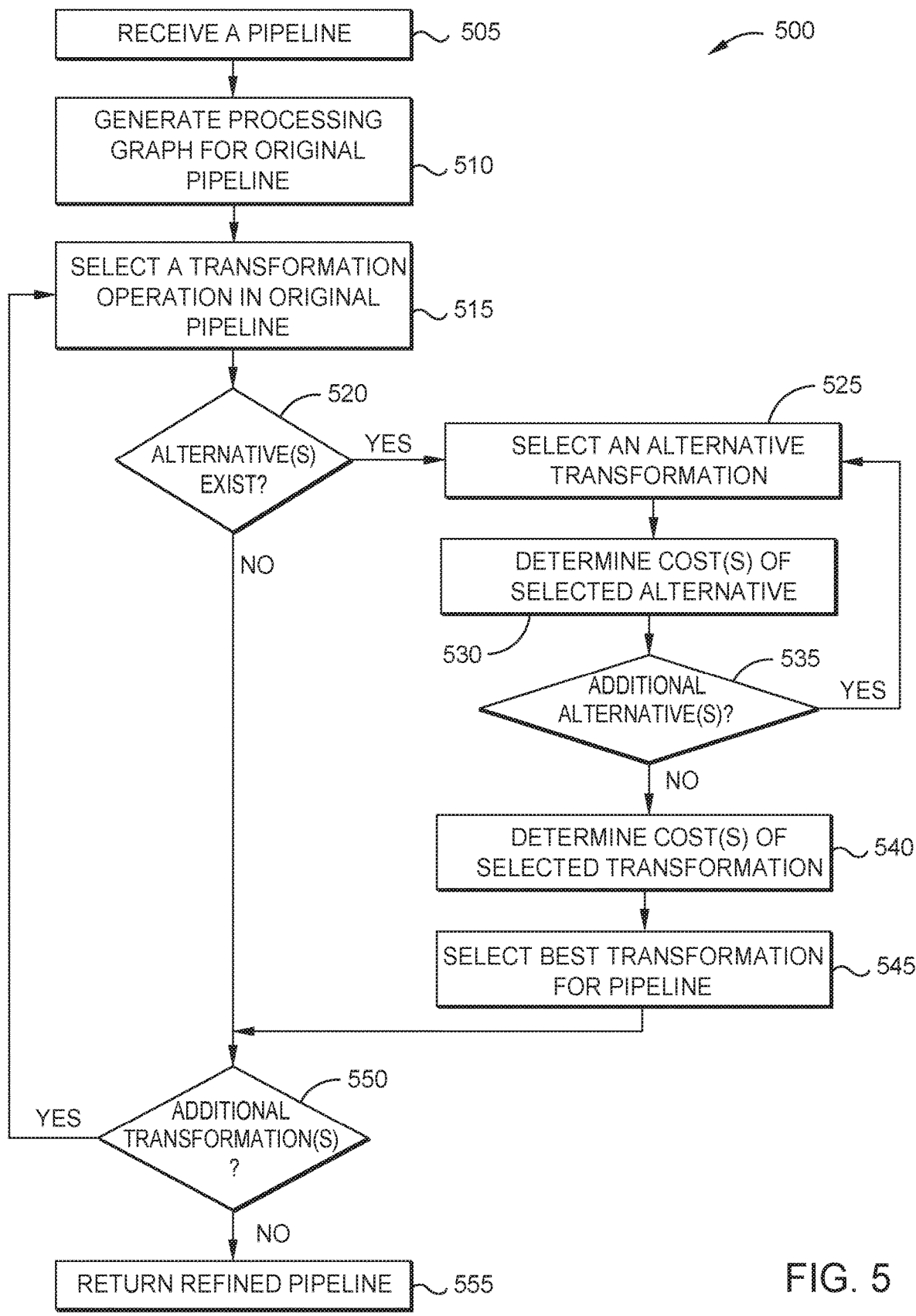
FIG. 5 is a flow diagram illustrating a method for automated pipeline optimization using alternative transformations, according to one embodiment disclosed herein.

FIG. 5 is a flow diagram illustrating a method 500 for automated pipeline optimization using alternative transformations, according to one embodiment disclosed herein. In the illustrated embodiment, the method 500 begins at block 505, where a Pipeline Optimizer 115 receives a data preparation pipeline. In some embodiments, the pipeline is received from a client. For example, the client may provide the pipeline and request that it be evaluated/optimized. In at least one embodiment, the Pipeline Optimizer 115 is one component in a system that provides ML services. For example, clients may define the structure and configuration of the preparation pipeline and ML models themselves, and transmit these specifications to an entity that hosts the models and provides computing resources.

In some embodiments, the pipeline is received as a serialized data file. Generally, the received pipeline specifies a set of one or more transformations, operations, or functions to be applied, and defines data flow between the transformations. At block 510, the Pipeline Optimizer 115 generates a processing graph for the received pipeline. In an embodiment, each vertex or node in the processing graph corresponds to one of the transformations or operations, and each edge in the graph corresponds to how data flows through the pipeline. In one embodiment, the Pipeline Optimizer 115 generates the graph by evaluating the data file itself to identify the transformations and data flow, without actually instantiating or building the pipeline. In at least one embodiment, the Pipeline Optimizer 115 builds the graph by building/instantiating the pipeline based on the received specification.

In some embodiments, the Pipeline Optimizer 115 then adds hooks or other structures to each transformation, in order to track data as it moves through the pipeline. The Pipeline Optimizer 115 can then run a set of sample data through the instantiated pipeline, and use this reflection mechanism to identify the transformations/operations performed at each node, as well as the sequence of transformations that are applied.

At block 515, the Pipeline Optimizer 115 selects one of the transformation operations from the original pipeline. In one embodiment, selecting the transformation operation is performed by selecting one of the nodes/vertices in the generated graph, and identifying the underlying function(s) in the pipeline. The method 500 then continues to block 520, where the Pipeline Optimizer 115 determines whether one or more alternatives exist for the selected transformation operation. In one embodiment, this includes searching a set of predefined transformations (e.g., the Optimized Transformations 210) to identify alterative functions that utilize the same input data, return the same output data, and perform the same operations/transformations as the selected function. In some embodiments, as discussed above, the Pipeline Optimizer 115 uses the signature of the selected operation to identify matching or relevant modified transformations.

If no alternative or modified transformations are available for the selected node, the method 500 continues to block 550, discussed in more detail below. Returning to block 520, if at least one modified, optimized, or alternative transformation operation exists for the selected function, the method 500 continues to block 525. At block 525, the Pipeline Optimizer 115 selects one of the identified alternative operations. The method 500 then proceeds to block 530, where the Pipeline Optimizer 115 quantifies the cost(s) of the selected alternative.

In one embodiment, the Pipeline Optimizer 115 does so by running the selected alternative on sample data. This sample data may be created or selected by the Pipeline Optimizer 115, or may be provided by the client. For example, in one such embodiment, the client can provide a sample of data that reflects the expected runtime data, which allows the Pipeline Optimizer 115 do determine the costs of the selected alternative based on realistic data. In some embodiments, the Pipeline Optimizer 115 instantiates and uses the original pipeline during runtime (e.g., to begin processing actual data in the deployment to train or use the model(s)). In such an embodiment, the Pipeline Optimizer 115 can process the data using the identified alternative(s) as well, during runtime, in order to quantify the costs of each using actual data.

In embodiments, the collected costs can include any number and variety of metrics, including latency, expense, memory usage, processor usage, storage usage, and the like. In some embodiments, the client may select and/or weight the cost(s) that should be considered. Once the cost(s) of the transformation are determined, the method 500 proceeds to block 535, where the Pipeline Optimizer 115 determines whether there is at least one alternative that has not yet been evaluated. If so, the method 500 returns to block 525. If the costs of all potential alternative transformation functions have been identified, the method 500 continues to block 540, where the Pipeline Optimizer 115 similar determines the cost(s) of the original transformation function in the pipeline. In embodiments, this can include evaluating sample data using the original pipeline. In some embodiments, as discussed above, this can include instantiating and using the pipeline during runtime, and monitoring the cost(s) of the operation as it processes real data in the system.

At block 545, the Pipeline Optimizer 115 selects the best of the evaluated transformations for use in the pipeline. That is, in an embodiment, the Pipeline Optimizer 115 identifies the function (which may be the original operation, or one of the identified alternatives) with the minimum costs. In some embodiments, this determination is made based in part on the client-defined weights for each cost metric. If the original transformation has the lowest cost, the Pipeline Optimizer 115 refrains from modifying this portion of the pipeline, and leaves the original element in place. If one of the alternatives is superior, however, the Pipeline Optimizer 115 can modify the pipeline by replacing the original transformation with the identified optimal one. For example, the Pipeline Optimizer 115 may modify function calls or other elements of the pipeline to route data through the optimized version, rather than the original operation.

The method 500 then proceeds to block 550, where the Pipeline Optimizer 115 determines whether there is at least one additional transformation operation in the original pipeline that has not yet been evaluated. If so, the method 500 returns to block 515. If each step in the original pipeline has been evaluated, the method 500 continues to block 555, where the Pipeline Optimizer 115 returns the refined pipeline. In some embodiments, this includes generating a serialized data file for the modified pipeline (including the replaced/alternative elements that were selected) and returning it to the client. In one embodiment, the system can instead instantiate the refined pipeline and begin using it in the deployed environment, to begin processing runtime data for the client.

Figure 6:
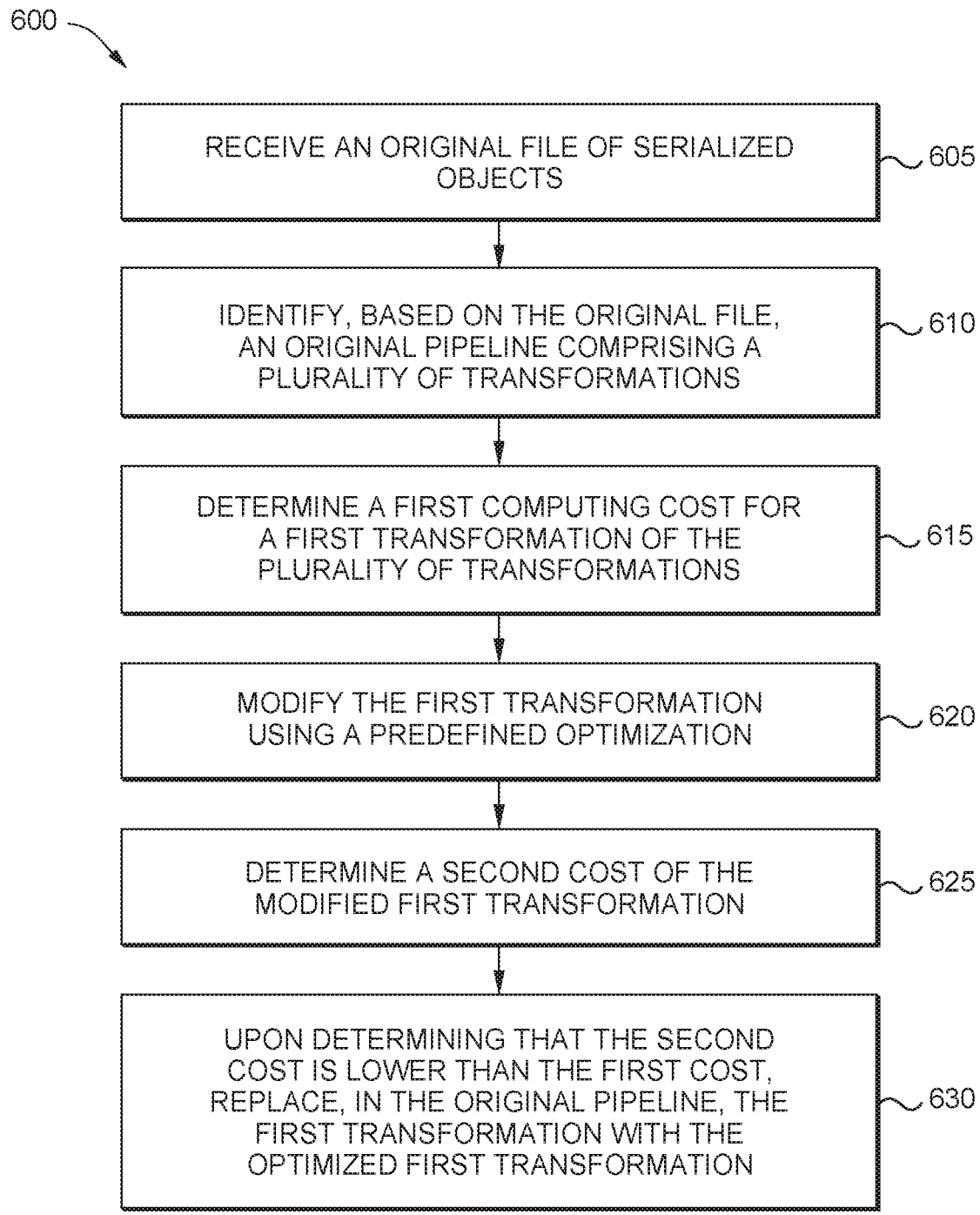
FIG. 6 is a flow diagram illustrating a method for automatically evaluating and implementing pipeline optimizations, according to one embodiment disclosed herein.

FIG. 6 is a flow diagram illustrating a method 600 for automatically evaluating and implementing pipeline optimizations, according to one embodiment disclosed herein. The method 600 begins at block 605, where a Pipeline Optimizer 115 receives an original file of serialized objects. At block 610, the Pipeline Optimizer 115 identifies, based on the original file, an original pipeline comprising a plurality of transformations. The method 600 then continues to block 615, where the Pipeline Optimizer 115 determines a first computing cost for a first transformation of the plurality of transformations. Further, at block 620, the Pipeline Optimizer 115 modifies the first transformation using a predefined optimization. At block 625, the Pipeline Optimizer 115 determines a second cost of the modified first transformation. The method 600 then proceeds to block 630 where, upon determining that the second cost is lower than the first cost, the Pipeline Optimizer 115 replaces, in the original pipeline, the first transformation with the optimized first transformation.

Figure 7:
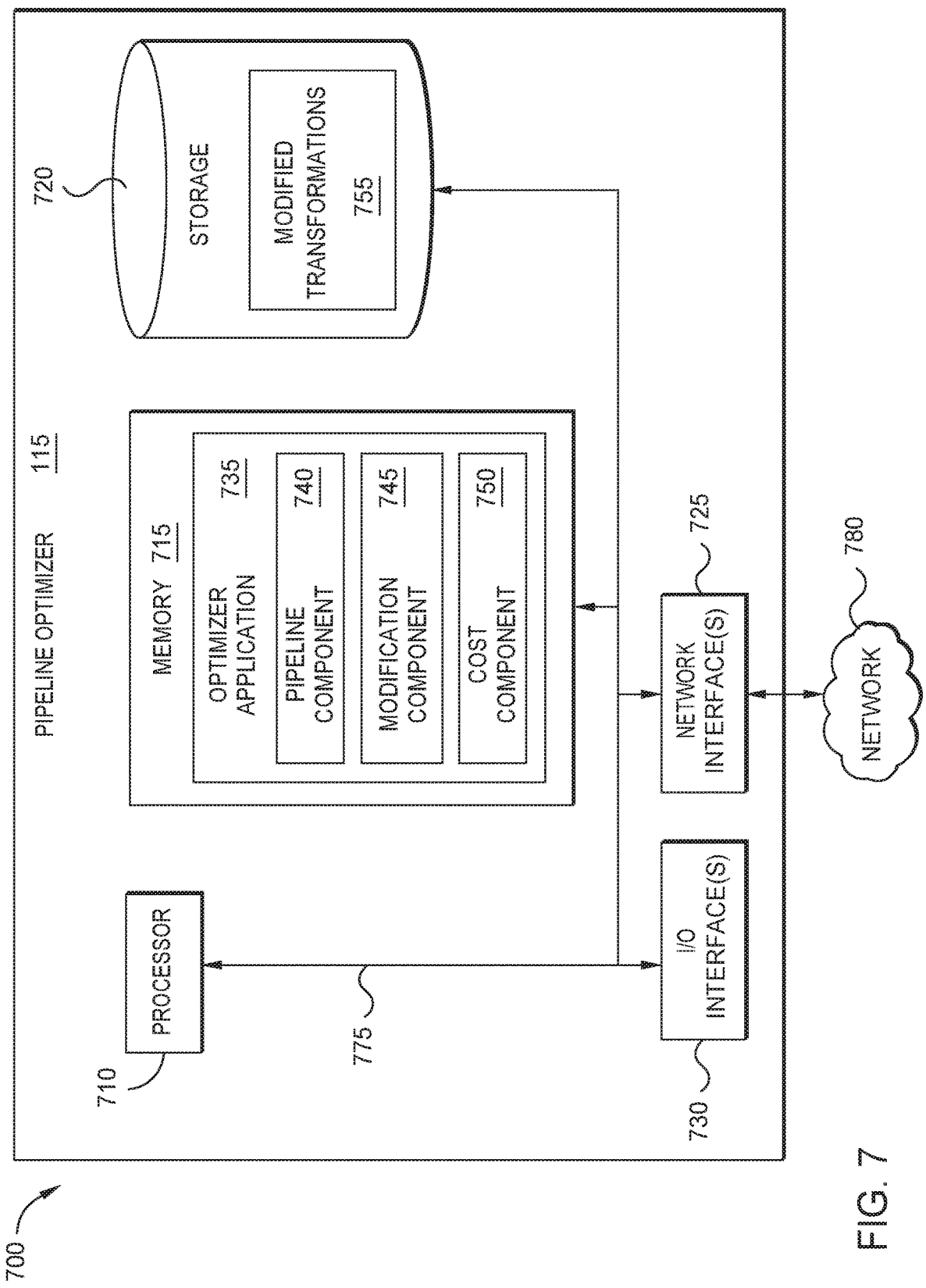
FIG. 7 is a block diagram illustrating a pipeline optimizer configured to automatically evaluate optimize transformation pipelines, according to one embodiment disclosed herein.

FIG. 7 is a block diagram illustrating a Pipeline Optimizer 115 configured to automatically evaluate optimize transformation pipelines, according to one embodiment disclosed herein. Although depicted as a physical device, in embodiments, the Pipeline Optimizer 115 may be implemented using virtual device(s), and/or across a number of devices (e.g., in a cloud environment). As illustrated, the Pipeline Optimizer 115 includes a Processor 710, Memory 715, Storage 720, a Network Interface 725, and one or more I/O Interfaces 730. In the illustrated embodiment, the Processor 710 retrieves and executes programming instructions stored in Memory 715, as well as stores and retrieves application data residing in Storage 720. The Processor 710 is generally representative of a single CPU and/or GPU, multiple CPUs and/or GPUs, a single CPU and/or GPU having multiple processing cores, and the like. The Memory 715 is generally included to be representative of a random access memory. Storage 720 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 730. Further, via the Network Interface 725, the Pipeline Optimizer 115 can be communicatively coupled with one or more other devices and components (e.g., via the Network 780, which may include the Internet, local network(s), and the like). As illustrated, the Processor 710, Memory 715, Storage 720, Network Interface(s) 725, and I/O Interface(s) 730 are communicatively coupled by one or more Buses 775.

In the illustrated embodiment, the Storage 720 includes a set of predefined Modified Transformations 755. In some embodiments, these Modified Transformations 755 are user-defined functions, transformations, and operations that are designed to perform one or more operations in different ways (e.g., taking advantage of parallelism). Each Modified Transformation 755 may perform differently based on the underlying data being processed. In at least one embodiment, each Modified Transformation 755 includes indications of the modification(s) that have been or should be applied to the original function, to implement the modification. In some embodiments, each Modified Transformation 755 further indicates the original function, allowing the Pipeline Optimizer 115 to easily identify the relevant/appropriate alternatives to each step in the original pipeline.

In the illustrated embodiment, the Memory 715 includes an Optimizer Application 735. Although depicted as software residing in Memory 715, in embodiments, the functionality of the Optimizer Application 735 can be implemented using hardware, software, or a combination of hardware and software. As illustrated, the Optimizer Application 735 includes a Pipeline Component 740, a Modification Component 745, and a Cost Component 750. Although depicted as discrete components for conceptual clarity, in embodiments, the operations of the Pipeline Component 740, Modification Component 745, and Cost Component 750 may be combined or distributed across any number of components and devices.

In an embodiment, the Pipeline Component 740 is configured to receive pipelines (or data files including serialized objects) used to process and transform data in preparation for use with one or more ML models. The Pipeline Component 740 can then construct a graph based on this file/pipeline, where each node in the graph corresponds to a transformation step and each edge indicates the flow of data between steps. In some embodiments, once the optimal modifications have been identified, the Pipeline Component 740 modifies the original pipeline as needed (e.g., by replacing original transformations with modified ones, by changing pointers or data flow, and the like). The Pipeline Component 740 may then return the optimized pipeline.

In the illustrated embodiment, the Modification Component 745 evaluates each step in the original pipeline to identify potential Modified Transformations 755. In some embodiments, as discussed above, the Modification Component 745 does so by identifying Modified Transformations 755 with the same or similar signature to the original step. In at least one embodiment, the Modified Transformations 755 may specifically identify the original function(s) they are intended to replace. In an embodiment, the Cost Component 750 is used to collect costs of each original element and the corresponding alternatives, as discussed above. For example, the Cost Component 750 may run test data through the transformations, and/or monitor the transformers as they process real data during runtime. This allows the Cost Component 750 to identify the lowest-cost transformation operation for each element of the pipeline.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Optimizer Application 735) or related data available in the cloud. For example, the Optimizer Application 735 could execute on a computing system in the cloud and analyze and refine data pipelines. In such a case, the Optimizer Application 735 could receive and optimize such pipelines, and store refined pipelines and predefined modifications at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:
1. A method, comprising:
accessing an original file comprising a set of serialized objects;
identifying, based on the original file, an original pipeline comprising a plurality of transformations;
determining a first computing cost for a first transformation of the plurality of transformations;
generating a modified first transformation by modifying the first transformation using a defined optimization;
determining a second computing cost of the modified first transformation; and
upon determining that the second computing cost is lower than the first computing cost, replacing, in the original pipeline, the first transformation with the modified first transformation.

2. The method of claim 1, wherein identifying the original pipeline comprises generating a data processing graph, wherein each respective vertex in the data processing graph represents a respective transformation of the plurality of transformations, and wherein each respective edge in the data processing graph specifies data flow in the original pipeline.

3. The method of claim 2, wherein generating the data processing graph comprises:
instantiating the original pipeline based on the original file;
executing the original pipeline on sample data;
identifying the plurality of transformations based on the execution; and
identifying a sequence of the plurality of transformations based on the execution.

4. The method of claim 2, wherein generating the data processing graph comprises evaluating the original file to identify the plurality of transformations and the data flow in the original pipeline, without instantiating the original pipeline.

5. The method of claim 1, wherein determining the first computing cost for the first transformation comprises:
executing the first transformation on sample data; and
evaluating the execution to determine a latency of performing the first transformation.

6. The method of claim 1, wherein the defined optimization comprises increased parallelization in the first transformation.

7. The method of claim 1, wherein the defined optimization comprises a one-row optimization for the first transformation.

8. The method of claim 1, the method further comprising:
generating an optimized file of serialized objects based on the original pipeline and the modified first transformation.

9. One or more computer-readable storage media collectively containing computer program code that, when executed by operation of one or more computer processors, performs an operation comprising:
accessing an original file comprising a set of serialized objects;
identifying, based on the original file, an original pipeline comprising a plurality of transformations;
determining a first computing cost for a first transformation of the plurality of transformations;
generating a modified first transformation by modifying the first transformation using a defined optimization;
determining a second computing cost of the modified first transformation; and
upon determining that the second computing cost is lower than the first computing cost, replacing, in the original pipeline, the first transformation with the modified first transformation.

10. The computer-readable storage media of claim 9, wherein identifying the original pipeline comprises generating a data processing graph, wherein each respective vertex in the data processing graph represents a respective transformation of the plurality of transformations, and wherein each respective edge in the data processing graph specifies data flow in the original pipeline.

11. The computer-readable storage media of claim 10, wherein generating the data processing graph comprises:
instantiating the original pipeline based on the original file;
executing the original pipeline on sample data;
identifying the plurality of transformations based on the execution; and
identifying a sequence of the plurality of transformations based on the execution.

12. The computer-readable storage media of claim 10, wherein generating the data processing graph comprises evaluating the original file to identify the plurality of transformations and the data flow in the original pipeline, without instantiating the original pipeline.

13. The computer-readable storage media of claim 9, wherein determining the first computing cost for the first transformation comprises:
executing the first transformation on sample data; and
evaluating the execution to determine a latency of performing the first transformation.

14. The computer-readable storage media of claim 9, wherein the defined optimization comprises (i) increased parallelization in the first transformation, or (ii) a one-row optimization for the first transformation.

15. The computer-readable storage media of claim 9, the operation further comprising:
generating an optimized file of serialized objects based on the original pipeline and the modified first transformation.

16. A system comprising:
one or more computer processors; and
one or more memories collectively containing one or more programs which when executed by the one or more computer processors performs an operation, the operation comprising:
accessing an original file comprising a set of serialized objects;
identifying, based on the original file, an original pipeline comprising a plurality of transformations;
determining a first computing cost for a first transformation of the plurality of transformations;
generating a modified first transformation by modifying the first transformation using a defined optimization;
determining a second computing cost of the modified first transformation; and
upon determining that the second computing cost is lower than the first computing cost, replacing, in the original pipeline, the first transformation with the modified first transformation.

17. The system of claim 16, wherein identifying the original pipeline comprises generating a data processing graph, wherein each respective vertex in the data processing graph represents a respective transformation of the plurality of transformations, and wherein each respective edge in the data processing graph specifies data flow in the original pipeline.

18. The system of claim 17, wherein generating the data processing graph comprises:
instantiating the original pipeline based on the original file;
executing the original pipeline on sample data;
identifying the plurality of transformations based on the execution; and
identifying a sequence of the plurality of transformations based on the execution.

19. The system of claim 17, wherein generating the data processing graph comprises evaluating the original file to identify the plurality of transformations and the data flow in the original pipeline, without instantiating the original pipeline.

20. The system of claim 16, wherein determining the first computing cost for the first transformation comprises:
- executing the first transformation on sample data; and
- evaluating the execution to determine a latency of performing the first transformation.

* * * * *